3,347,829
COPOLYMERS OF FORMALDEHYDE WITH N-FLUOROIMINO-α-CYANO COMPOUNDS
Robert N. MacDonald, Wilmington, Del., assignor to E. I. du Pont de Nemours and Company, Wilmington, Del., a corporation of Delaware
No Drawing. Filed Oct. 28, 1965, Ser. No. 505,463
9 Claims. (Cl. 260—64)

ABSTRACT OF THE DISCLOSURE

Solid film-forming copolymers of formaldehyde with selected N-fluoroimino compounds, particularly N-fluoroiminomalononitrile, 2 - (N - fluoroimino)phenylacetonitrile and methyl 2 - (N - fluoroimino) - 2 - cyanoacetate, and their preparation by direct polymerization in the presence of suitable initiators.

Cross reference to related application

This is a continuation-in-part of application Ser. No. 270,542, filed Apr. 4, 1963, and now abandoned.

Summary and details of the invention

This invention relates to, and has as its principal objects provision of, novel compositions of matter, i.e., solid copolymers of formaldehyde with N-fluoroiminocyano compounds, and the preparation of the same. Particularly important in the invention are linear copolymers which contain at least 5% by weight of the N-fluoroiminocyano compound and in which the N-fluoroiminocyano compound is N-fluoroiminomalononitrile.

In its composition of matter aspect, the present invention comprises copolymers of formaldehyde and N-fluoroiminocyano compounds of the general formula

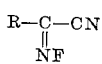

in which R is cyano; alkoxy of up to 18 carbons; cycloalkoxy of up to 6 carbons; aryl or alkaryl of up to 10 carbons; $SF_5$—(sulfur pentafluoride); $ArSO_2$—(arylsulfonyl), Ar being aryl or alkaryl of up to 10 carbons; $N_3$—(azido); or one of the radicals R'OCO—, R'CO—, R'COO—, R'COOCH₂— or R'S—, in which radicals R' is alkyl of up to 18 carbons or cycloalkyl of up to 6 carbons.

Specific examples of N-fluoroiminocyano compounds suitable for copolymerization with formaldehyde include N-fluoroiminomalononitrile, 2 - (N - fluoroimino) - 2-methoxyacetonitrile, 2 - (N-fluoroimino) - 2 - butoxyacetonitrile, 2 - (N-fluoroimino) - 2 - dodecyloxyacetonitrile, 2 - (N-fluoroimino) - 2 - octadecyloxyacetonitrile, 2 - (N-fluoroimino) - 2 - cyclopentyloxyacetonitrile, 2 - (N-fluoroimino) - 2 - cyclohexyloxyacetonitrile, 2 - (N-fluoroimino)phenylacetonitrile, 2 - (N-fluoroimino) - p-tolyacetonitrile, 2 - (N-fluoroimino) - (4 - butylphenyl) acetonitrile, 2 - (N-fluoroimino)naphthylacetonitrile, N-fluoroiminocyanomethyl sulfur pentafluoride, 2 - (N-fluoroimino) - 2 - phenylsulfonylacetonitrile, 2 - (N-fluoroimino) - 2 - (4 - ethylphenyl)sulfonylacetonitrile, 2 - (N-fluoroimino) - 2 - naphthylsulfonylacetonitrile, 2 - (N-fluoroimino) - 2 - azidoacetonitrile, methyl 2 - (N-fluoroimino) - 2 - cyanoacetate, ethyl 2 - (N-fluoroimino) 2-cyanoacetate, t-butyl 2-(N-fluoroimino)-2-cyanoacetate, octadecyl 2 - (N-fluoroimino)-2-cyanoacetate, cyclohexyl 2 - (N-fluoroimino)-2-cyanoacetate, N-fluoroiminocyanomethyl methyl ketone, N-fluoroiminocyanomethyl butyl ketone, N-fluoroiminocyanomethyl hexadecyl ketone, N-fluoroiminocyanomethyl cyclopentyl ketone, 2 - (N-fluoroimino) - 2 - acetoxyacetonitrile, 2 - (N-fluoromino) - 2-propionyloxyacetonitrile, 2-(N-fluoroimino)2-dodecanoyloxyacetonitrile, 2 - (N-fluoroimino) - 2 - cyclohexanecarbonyloxyacetonitrile, 2 - (N-fluoroimino) - 2 - acetoxymethylacetonitrile, 2 - (N-fluoroimino) - 2 - decanoyloxymethylacetonitrile, 2 - (N-fluoroimino) - 2 - methylthioacetonitrile, 2 - (N-fluoroimino) - 2 - butylthioacetonitrile, 2 - (N-fluoroimino) - 2 - cyclohexylthioacetonitrile, and the like.

The above N-fluoroiminocyano compounds are products disclosed in the Logothetis U.S. Patent 3,215,709; and they may be prepared as described in that patent. Thus, such compounds in which R ($R^3$) is cyano, alkoxy, cycloalkoxy, alkoxycarbonyl, cabacyl, carbacyloxy, carbacyloxymethylene, aryl, or sulfur pentafluoride are obtained by the interaction of tetrafluorohydrazine and vinyl compounds of the general formula $R^3$—CH=CH₂, in the presence of a hydrogen halide acceptor, e.g., an alkali metal fluoride, according to the scheme:

(I) 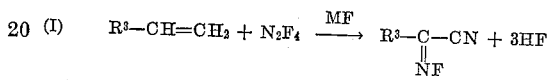

In a convenient method of operating the above-mentioned Logothetis process a pressure reaction is charged with an essentially equimolar mixture of tetrafluorohydrazine and monoolefinic compound and an amount of alkali metal fluoride which is at least equivalent to the hydrogen fluoride liberated in the reaction and, desirably, a normally liquid reaction medium which is inert to the reactants and reaction products. The reactor is closed and the contents are heated to between 60° and 175° C. for from 30 minutes to 10 hours. Thereafter the reaction mixture is allowed to cool to ambient temperature, the reactor is discharged, and the contents subjected to distillation under reduced pressure to recover the desired products.

*Caution is essential in handling $N_2F_4$.*—Reactions should be carried out on as small a scale as possible to minimize laboratory handling hazards of the products. Adequate shielding is essential during workup of the products as explosions may occur. For storage and handling of $N_2F_4$, previously fluorinated Monel® or stainless steel cylinders fitted with Monel® valves are recommended.

In the reaction of Equation I there can be used any monoolefinic or vinyl compound of the formula $$R^3—CH=CH_2$$

wherein $R^3$ is cyano, alkoxy of up to 18 carbons, cycloalkoxy of up to 6 carbons, aryl or alkaryl of up to 10 carbons, R'OCO—, R'CO, R'COO—, or R'COOCH₂—, R' being alkyl of up to 18 carbons or cycloalkyl of up to 6 carbons, or —$SF_5$. Examples of such compounds are vinyl acetate, vinyl propionate, vinyl decanoate, vinyl octadecanoate, vinyl cyclohexanecarboxylate, acrylonitrile, styrene, 4-vinyltoluene, α-vinylnaphthalene, methyl, ethyl, octyl, dodecyl, and octadecyl acrylates, allyl acetate, allyl propionate, allyl dodecanoate, methyl vinyl ether, octadecyl vinyl ether, cyclohexyl vinyl ether, methyl vinyl ketone, butyl vinyl ketone, hexadecyl vinyl ketone, cyclohexyl vinyl ketone, vinyl sulfur pentafluoride and the like.

N-fluoroiminocyano compounds in which R ($R^4$) is arylsulfonyl, alkylthio or azido are obtained by replacing the carbon-bonded fluorine or chlorine in N-fluoroiminofluoro (or chloro) acetonitrile in accordance with the equation:

(II) 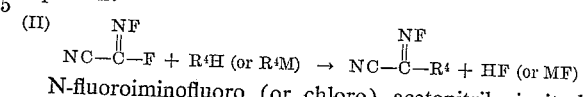

N-fluoroiminofluoro (or chloro) acetonitrile is itself prepared as described in the aforementioned Logothetis patent by reacting a vinyl halide of the formula $$X—CH=CH_2$$

in which X is fluorine or chlorine, with $N_2F_4$ in the presence of a hydrogen halide acceptor, e.g., an alkali metal fluoride, in accordance with the equation:

(III) 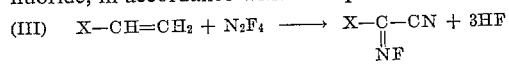

In the process aspect of the present invention, a reactor equipped with agitating means and means for introducing monomeric formaldehyde and the N-fluoroiminocyano compound is cooled to a temperature at which monomeric formaldehyde is liquid, e.g., $-78°$ C., and the N-fluoroiminocyano compound is added, followed by addition of monomeric formaldehyde. To the resulting solution there is added, with agitation, a catalytic amount of a formaldehyde-polymerization initiator, e.g., a triarylphosphine. The polymer which forms is isolated by any convenient means such as evaporation of the volatile components under reduced pressure.

It is to be understood that other methods for effecting the copolymerization, known to those skilled in the art, can be used in preparing the copolymers of this invention. For example, the N-fluoroiminocyano compound can be dissolved in an inert medium such as ether, etc., between $-80°$ C. and $-70°$ C., and to the agitated solution is added monomeric formaldehyde, followed by addition of a formaldehyde polymerization initiator. The polymer which forms is separated by filtration and dried. Alternatively, the polymer can be isolated by evaporation of the volatile components.

The monomeric formaldehyde is added to the N-fluoroiminocyano compound in amount sufficient to provide at least one mole thereof per mole of N-fluoroiminocyano compound. Generally, however, larger amounts of monomeric formaldehyde are used, e.g., from 5 to 55 moles per mole of N-fluoroiminocyano compound.

As a rule the copolymers are made at temperatures in the range of $-80°$ C. to $-70°$ C., a temperature range in which a homogeneous solution of the N-fluoroiminocyano compound in liquid formaldehyde is obtained before initiation of polymerization.

Usually the reaction is carried out at atmospheric pressure but, if desired, closed reactors and conditions requiring superatmospheric pressures can be used.

In general, the amount of formaldehyde-polymerization initiator employed will be from 0.0003 weight percent to 1 weight percent, based on the weight of the monomeric formaldehyde charged to the reactor. Suitable initiators are the triarylphosphines, -arsines, -stibines and -bismuthines; primary, secondary, and tertiary aliphatic amines; tertiary dialkylmonoarylamines; onium compounds of the kind disclosed and claimed in U.S. Patent 2,994,687, such as tetra-n-butylammonium laurate, trimethylstearylammonium laurate, triethylbenzyl ammonium acetate, etc. Exemplary triarylphosphines, -arsines, -stibines and -bismuthines are triphenylphosphine, tritolylphosphine, triphenylarsine, tritolylstibine, triphenylbismuthine, etc., and examples of primary, secondary, and tertiary aliphatic amines and tertiary dialkylmonoarylamines are butylamine, dihexylamine, triethylamine, tributylamine, N,N-dimethylaniline, N,N-diethylaniline, and the like.

The copolymers obtained by this process contain between about 3% and 75% by weight of polymerized N-fluoroiminocyano compound, the most useful copolymers generally containing between about 5% and about 50% by weight of this component.

The present novel copolymers form strongly adherent films when heated on metal substrates and these films resist degradation to a remarkable degree when subjected to high temperatures. They are therefore useful as high-temperature-resistant coatings. The copolymers can also be drawn to fibers which are flexible and useful in textile applications or can be pressed to films which are useful as wrapping foils.

The examples which follow illustrate but do not limit the invention. Parts are by weight and pressures are atmospheric, under a nitrogen blanket, unless otherwise specified, α-polyoxymethylene has been used as the source of monomeric formaldehyde in these examples only for the sake of convenience. Monomeric formaldehyde from any source can be used in making the copolymers of this invention.

EXAMPLE I

A thoroughly dried reaction vessel, maintained under a nitrogen atmosphere at $-78°$ C., was charged with 1.16 parts of N-fluoroiminomalononitrile and 9.2 parts of monomeric formaldehyde generated by the pyrolysis of alkali-precipitated α-polyoxymethylene, purified by passage through two traps held at $-15°$ C. and condensed into a graduated trap held at $-78°$ C.

The mixture was stirred to dissolve the frozen N-fluoroiminomalononitrile and the resulting solution was clear. After about 10 minutes there was added as a catalyst or polymerization initiator 0.0026 part of triphenylphosphine in 0.7 part of sodium dried diethyl ether, whereupon lavender conglomerates immediately formed in the solution. After 33 minutes, excess monomers, chiefly formaldehyde, were removed under 2-mm. pressure at the $-78°$ C. temperature at which the system had been maintained. When the remaining polymeric solid (0.3 part) was warmed to room temperature, its color changed to a light orange. The resultant light orange-colored copolymer of formaldehyde and N-fluoroiminomalononitrile was tacky in feel, somewhat rubbery, and soluble in s-dichlorotetrafluoroacetone hydrate containing 2% triethylamine, in which solvent mixture it exhibited an inherent viscosity of 0.25 at a concentration of 0.1% and 25° C.

The flourine content of the copolymer was 7.31% shortly after preparation but dropped to 2.61% after two months. This evidently resulted from loss of fluoine and not $NF{=}C(CN)_2{-}$, since the nitrogen content was 18.22% after six months. These data correspond to a $CH_2O/FN{=}C(CN)_2$ ratio of 4.9. At the time the fluorine content was 2.61%, the polymer softened on a copper block at 65–70° C. to a stiff plastic mass which became infusible at 180° C. and remained so as the temperature was raised up to 300° C. This result shows that this copolymer is useful in applications where a high order of resistance to high temperatures is required.

EXAMPLE II

The procedure of Example I was followed with 0.2 part of N-fluoroiminomalononitrile, 1.8 parts of formaldehyde, and, as catalyst, about 0.002 part of dimethyl di(hydrogenated tallow) ammonium acetate (see U.S. Patent 2,994,687) in 0.14 part of ether. There was obtained, after two ether washes and drying in a vacuum oven at 60° C., 0.1 part of a solid formaldehyde-N-fluoroiminomalononitrile copolymer resembling in appearance the copolymer of Example I. The copolymer softened at 75° C. The softened copolymer, spread on the metal block, gave a coating that became infusible as the temperature was raised to 170° C. This coating remained adherent and intact as the temperature was further raised and held at 300° C. for 15 minutes. The copolymer analyzed 2.36% fluorine and 16.34%, 16.47% nitrogen. These data indicate that the copolymer had a $$CH_2O/FN{=}C(CN)_2$$

ratio of 5.7.

EXAMPLE III

Example II was repeated except that, as a catalyst, 0.02 part of n-butylamine was used. There was obtained 1.02 parts of a cream-colored solid copolymer which softened at 148° C., became infusible as the temperature was raised to 190° C. and remained so as the temperature was increased to 300° C. The copolymer analyzed 5.50% nitrogen and 1.52% fluorine. These data correspond to a $CH_2O/FN{=}C(CN)_2$ ratio of 22.4. The inherent viscosity was 0.15 in p-chlorophenol containing 2% α-pinene at 0.5% concentration and 60° C.

EXAMPLE IV

The procedure of Example II was followed with 0.002 part of triisoamylamine in 0.14 part of ether as the catalyst. There was obtained 0.41 part of a light orange-colored copolymer which softened at 168° C. and became infusible at 185° C. The copolymer formed an adherent coating on the melting point block which survived heating to 300° C. for 15 minutes. The copolymer analyzed 5.30% nitrogen and 0.98% fluorine. These data correspond to a CH₂O/FN=C(CN)₂ ratio of 33. The inherent viscosity was 0.19 at 0.1% concentration in p-chlorophenol containing 2% α-pinene and 60° C.

A tough, essentially clear film 2 mils in thickness was pressed by subjecting the above polymer to 500 lbs. ram pressure at 170° C. This film is useful as a wrapping foil.

EXAMPLE V

Example II was repeated with 0.005 part of stearyldimethylamine in 0.14 part of ether as the catalyst. Before addition of the tertiary amine, 0.005 part of aniline in 0.14 part of ether had been added without causing polymerization. There was obtained 1.93 parts of a pale salmon-colored copolymer softening at 158° C. A flexible film was pressed from the copolymer on a metal block heated to slightly above the softening temperature. Films of the copolymer are useful as wrapping foil. As the temperature was increased to 300° C., the polymer became infusible. The copolymer analyzed 2.46% nitrogen and 0.79% fluorine. These data correspond to a $$CH_2O/FN=C(CN)_2$$

ratio of 54.5. The inherent viscosity was 0.24 in p-chlorophenol containing 2% α-pinene at 0.5% concentration and 60° C.

EXAMPLE VI

Example I was repeated with 1 part of 2-(N-fluoroimino)phenylacetonitrile, 4.6 parts of formaldehyde in 7 parts of sodium-dried ether, and 0.0026 part of triphenylphosphine in 0.35 part of ether. There was obtained 3.75 parts of a colorless solid copolymer softening on a copper block at 168° C. to a viscous melt from which flexible filaments were drawn. A solution of the polymer made up in boiling acetic anhydride cooled in a thin layer on a glass surface gave a clear, flexible film upon being leached with water. Infrared absorption at 4.54μ indicated the presence of nitrile groups in the copolymer both before and after solution in acetic anhydride. The inherent viscosity was 0.62 in p-chlorophenol containing 2% α-pinene at 0.5% concentration and 60° C. By elemental analysis, it was found that the copolymer contained 2.3% fluorine and 3.75% nitrogen. These data correspond to a $$CH_2O/FN=C(C_6H_5)CN$$

ratio of 20.

The 2-(N-fluoroimino)phenylacetonitrile employed in this example was prepared following the procedure described above with styrene as the olefinic compound and sodium fluoride as the hydrogen halide acceptor.

EXAMPLE VII

The reactor was charged with 0.5 part of methyl 2-(N-fluoroimino)-2-cyanoacetate, 4.6 parts of anhydrous formaldehyde and 0.0026 part of triphenylphosphine in 0.35 part ether and the charge held at −78° C. for 30 minutes. There was obtained 2.3 parts of a salmon-colored solid copolymer melting at 145° C. The melting point was not changed by trituration with benzene, followed by ether, or by dissolution in acetic anhydride and reprecipitation by cooling and diluting with water. Infrared absorption at 4.45μ indicated nitrile groups and at 5.67μ the carbonyl of the carbomethoxy group. Units corresponding to —CH₂O— were evident in the 9μ region. The polymer contained 39.27% carbon, 6.36% hydrogen, 1.68% nitrogen and 2.45% fluorine. Based on the fluorine content, the CH₂O/FN=C(CN)COOCH₃ ratio is 21.4. The inherent viscosity was 0.04 in p-chlorophenol containing 2% α-pinene at 60° C. at a concentration of 0.5%.

Since obvious modifications and equivalents in the invention will be evident to those skilled in the chemical arts, I propose to be bound solely by the appended claims.

The embodiments of the invention in which an exclusive property or privilege is claimed are defined as follows:

1. The polymerization process for preparing a copolymer which comprises:
   reacting,
   at a temperature in the range of about −80° to −70° C. and
   in the presence of about 0.0003 to 1 percent, by weight, based on the weight of formaldehyde used, of a formaldehyde polymerization initiator selected from the group consisting of triarylphosphines, -stibines and -bismuthines, tertiary aliphatic amines and onium compounds claimed in U.S. Patent No. 2,994,687,
   (1) between about 1 and 55 moles of liquid formaldehyde, per mole of coreactant, and
   (2) as coreactant, an N-fluoroiminocyano compound of the formula

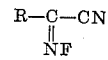

wherein:
   R is selected from the group consisting of cyano; alkoxy of up to 18 carbons; cycloalkoxy of up to 6 carbons; aryl or alkaryl of up to 10 carbons; SF₅—; ArSO₂—, Ar being aryl or alkaryl of up to 10 carbons; N₃—; and R'OCO—, R'CO—, R'COO—, R'COOCH₂—, and R'S—, R' being alkyl of up to 18 carbons or cycloalkyl of up to 6 carbons.

2. A solid copolymer of (1) formaldehyde and (2) an N-fluoroiminocyano compound of the formula

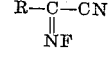

wherein:
   R is selected from the group consisting of cyano; alkoxy of up to 18 carbons; cycloalkoxy of up to 6 carbons; aryl or alkaryl of up to 10 carbons; SF₅—; ArSO₂—, Ar being aryl or alkaryl of up to 10 carbons; N₃—; and R'OCO—, R'CO—, R'COO—, R'COOCH₂— and R'S—, R' being alkyl of up to 18 carbons or cycloalkyl of up to 6 carbons;
   said copolymer containing between about 3 and 75% by weight of the polymerized N-fluoroiminocyano compound and formed according to claim 1.

3. A film formed from a polymer of claim 1.

4. A polymerization process of claim 1 in which the N-fluoroiminocyano compound is N-fluoroiminomalononitrile.

5. A polymerization process of claim 1 in which the N-fluoroiminocyano compound is 2-(N-fluoroimino)-phenylacetonitrile.

6. A polymerization process of claim 1 in which the N-fluoroiminocyano compound is methyl 2-(N-fluoroimino)-2-cyanoacetate.

7. A composition formed according to claim 4 consisting of a copolymer of formaldehyde and N-fluoroiminomalononitrile.

8. A composition formed according to claim 5 consisting of a copolymer of formaldehyde and 2-(N-fluoroimino)phenylacetonitrile.

9. A composition formed according to claim 6 consisting of a copolymer of formaldehyde and methyl 2-(N-fluoroimino)-2-cyanoacetate.

(References on following page)

References Cited

UNITED STATES PATENTS

| | | | |
|---|---|---|---|
| 2,464,120 | 3/1949 | Dickey et al. | 260—78.5 |
| 3,043,803 | 7/1962 | Lewis et al. | 260—67 |
| 3,215,709 | 11/1965 | Logothetis | 260—349 |

OTHER REFERENCES

English translation, p. 11–21, from Kunststoffe, vol. 52 (1963), pp. 424–36.

WILLIAM H. SHORT, *Primary Examiner.*

L. M. PHYNES, *Assistant Examiner.*

UNITED STATES PATENT OFFICE
CERTIFICATE OF CORRECTION

Patent No. 3,347,829　　　　　　　　　　　　October 17, 1967

Robert N. MacDonald

It is hereby certified that error appears in the above numbered patent requiring correction and that the said Letters Patent should read as corrected below.

Column 6, line 55, for the claim reference numeral "1" read -- 2 --.

Signed and sealed this 5th day of November 1968.

(SEAL)
Attest:

Edward M. Fletcher, Jr.
Attesting Officer

EDWARD J. BRENNER
Commissioner of Patents